UNITED STATES PATENT OFFICE.

HEINRICH POLIKIER, OF BERLIN, GERMANY, ASSIGNOR TO ACTIEN GESELLSCHAFT FÜR ANILIN FABRIKATION, OF BERLIN, GERMANY.

BLUE ACID DYE.

SPECIFICATION forming part of Letters Patent No. 688,966, dated December 17, 1901.

Application filed September 28, 1901. Serial No. 76,956. (No specimens.)

*To all whom it may concern:*

Be it known that I, HEINRICH POLIKIER, of Berlin, in the Kingdom of Prussia, German Empire, have invented new and useful Improvements in Blue Acid Dyes; and I do hereby declare that the following is a full, clear, and exact description of the invention, which will enable others skilled in the art to which it appertains to make and use the same.

In a previous specification I have described the basic dyestuffs which were obtained by condensing alkylated derivatives of meta-tolyl-alpha- or beta-naphthylamin with tetraälkyldiamidobenzophenone. In carrying my researches about this subject further I have now found that the above-mentioned coloring-matters, by a treatment with sulfonating agents, are easily converted into the corresponding sulfonic acids, which also form valuable dyestuffs, distinguished by their fastness to washing.

In carrying out my invention practically I proceed as follows: One part of the dyestuff produced by condensing methyl-meta-tolyl-beta-naphthylamin with tetramethyldiamidobenzophenone is introduced into three parts of sulfuric-acid monohydrate at about 25° centigrade. Two parts of fuming sulfuric acid containing sixty per cent. of sulfuric anhydrid are added to the solution obtained at about 20° to 30° centigrade, and the mixture is kept at this temperature until a sample dissolves to a clear solution in diluted ammonia. The mass is then poured into ice-water, whereupon the new sulfonic acid separates. It is filtered off and converted by one of the well-known methods into its sodium salt. It forms in the dry state a violet powder with a bronze-like luster, easily soluble in alcohol, very easily soluble in water to clear-blue solutions. The aqueous solution remains unchanged on addition of a small proportion of sodium carbonate or caustic-soda lye, but it is precipitated by an excess of these agents.

The dyestuff dissolves in concentrated sulfuric acid to a brown-red solution, which on gradual dilution with ice-water becomes greenish-brown, green, and finally clear blue. It produces on wool blue shades of great intensity.

Having thus described my invention and in what manner the same is to be performed, what I claim as new is—

The new acid dyestuff being a sulfonic acid of the condensation product obtained from tetraälkyldiamidobenzophenone and alkyl-m-tolyl-naphthylamin, said dye forming in the dry state a violet-blue powder with a bronze-like luster, easily soluble in alcohol and very easily soluble in water forming clear-blue solutions; the aqueous solution remaining unchanged on addition of a small amount of sodium carbonate or caustic-soda lye, but being precipitated in the form of blue flakes by an excess of these agents; the dye dissolving in concentrated sulfuric acid to a red-brown solution which on gradual dilution with ice-water gets greenish-brown, green and finally clear blue, and producing on wool clear-blue shades of great intensity and distinguished by their fastness to washing.

In witness whereof I have hereunto signed my name, this 13th day of September, 1901, in the presence of two subscribing witnesses.

HEINRICH POLIKIER.

Witnesses:
HENRY HASPER,
WOLDEMAR HAUPT.